United States Patent [19]
Maurer

[11] 3,811,958
[45] May 21, 1974

[54] MECHANICALLY FASTENED TRANSITION FITTING

[75] Inventor: James Herbert Maurer, McHenry, Ill.

[73] Assignee: Pneumo Dynamics Corporation, Cleveland, Ohio

[22] Filed: Feb. 24, 1972

[21] Appl. No.: 227,782

[52] U.S. Cl............ 136/233, 136/230, 136/235, 136/242, 156/49
[51] Int. Cl............................................. H01v 1/02
[58] Field of Search .................... 136/230–235, 136/242; 156/49

[56] References Cited
UNITED STATES PATENTS

| | | | |
|---|---|---|---|
| 2,526,491 | 10/1950 | Liston et al. | 136/232 X |
| 3,232,794 | 2/1966 | Korton | 136/233 |
| 3,013,097 | 12/1961 | Fritts et al. | 136/272 X |
| 3,427,208 | 2/1969 | Lowdermilk | 136/235 |
| 3,447,986 | 6/1969 | Kasahara | 156/49 |
| 3,463,674 | 8/1969 | Black et al. | 136/233 |
| 3,615,960 | 10/1971 | Hoshii et al. | 156/49 |

FOREIGN PATENTS OR APPLICATIONS

| | | | |
|---|---|---|---|
| 925,604 | 5/1963 | Great Britain | 136/230 |

Primary Examiner—Leland A. Sebastian
Assistant Examiner—E. A. Miller
Attorney, Agent, or Firm—Donnelly, Maky, Renner & Otto

[57] ABSTRACT

A thermocouple assembly in which the sensing element is encased in a metallic sheath and joined to extension wires within a tubular transition fitting which is swaged to the sheath and which may be filled with encapsulation material.

9 Claims, 3 Drawing Figures

PATENTED MAY 21 1974　　　　　　　　　　　　　　　　3,811,958

MECHANICALLY FASTENED TRANSITION FITTING

BACKGROUND OF THE INVENTION

Various forms of thermocouple assemblies are presently available, many consisting of a sensing element which includes metallic sheathed, mineral insulated thermocouple wires which in turn are connected to extension wires, the latter typically having insulation thereon consisting of the various fibrous materials, plastics, dip coatings and the like. The thermocouple wires and the extension wires are commonly brazed together to effect a suitable electrical connection, and it is also known to encase such splice within a sleeve or transition piece and to fill the enclosure thus formed with potting compound for support and for protection from moisture and the like.

In typical constructions the sleeve is brazed to the metallic sheath of the sensing element after the splice is made on the wires. Consequently, considerable heat is transmitted over the length of the transition piece and may have a degrading effect on the relatively small thermocouple wires protruding from the sensing element, on the mineral insulation or sealing material securing the thermocouple wires within the sheath as well as on the previously brazed splice between the thermocouple and extension wires. The brazing operation between the transition piece and metallic sheath is a relatively expensive operation, usually involving a costly silver braze alloy and requiring considerable time during the brazing operation and subsequent clean-up after same wherein the flux and oxides produced are removed in order to prevent corrosion, such procedure often including the removal of excess silver solder.

SUMMARY OF THE INVENTION

Therefore it is one object of this invention to provide an improved thermocouple assembly in which the degrading effect of heat in adjoining parts of the assembly has been eliminated.

It is another object of this invention to provide an improved thermocouple assembly in which the transition piece is attached to the metallic sheath of a sensing element by crimping or swaging.

It is still another object of this invention to provide an improved transition fitting for thermocouple assemblies providing a rigid and reliable structure which is lower in cost than known assemblies.

These objects are attained in the instant invention in a thermocouple assembly in which various forms of transition fittings are swaged onto the metallic sheath of the sensing element of a thermocouple affording protection to the brazed electrical connection therein and partial support for the extension wires. In three described embodiments of the invention the transition fitting can be formed from a tubular member having a uniform major diameter with a portion reduced in diameter by machining to provide necessary swaging thickness or from tubing which is selected with the proper inside diameter to slide over the sheath or still further by tapering tubing to a reduced diameter neck portion in a metal forming process to fit the respective sheath and/or extension wire jacket.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
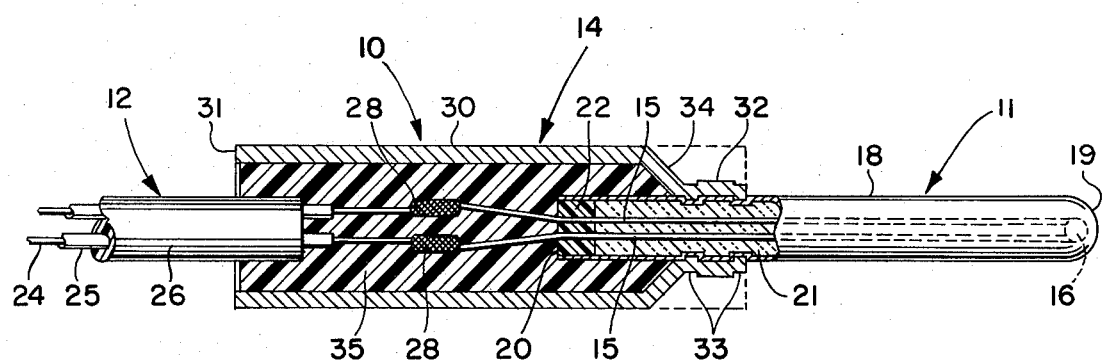
FIG. 1 is an elevational view partly in cross-section of a first embodiment of the invention showing a thermocouple assembly with machined transition fitting.

Referring now to FIG. 1 there is shown a first embodiment of the invention consisting of the thermocouple assembly shown generally at 10 comprising a sensing element 11, a portion of an extension wire 12 and a transition fitting 14 disposed therebetween. The sensing element 11 of the assembly is of conventional configuration comprising a pair of thermocouple wires 15 welded together or otherwise joined at one end 16 to form the thermocouple junction which produces an electric current flow when exposed to a source of heat, this effect being produced by the transfer of electrons in the dissimilar thermocouple wires 15.

A casing 18 is conventionally employed for the sensing element 11 for protection of the thermocouple wires 15 to allow the exposure of same in various environments, such casing 18 comprising a generally tubular metallic sheath having a closed end 19 and an open end 20 through which the thermocouple wires 15 protrude. The casing 18 is of thin wall construction and is selected for suitable heat transfer characteristics, being relatively slender and of any desired length suited for the application intended. The casing 18 is typically filled with mineral insulation 21 which provides support for the thermocouple wires 15 therein although other types of insulation may be utilized in this environment. The open end 20 of the casing 18 is filled with sealing material 22 to retain the mineral insulation 21 and the thermocouple wires 15 in place.

The extension wires 12 comprise a pair of electrically conductive wires 24 adapted to transmit current developed at the thermocouple junction 16 to a remote utilization device for any intended purpose and typically each wire 24 is encased in insulation 25, the pair of wires 24 being further supported and insulated with a jacket 26 which may be a fibrous material, plastic, dip coating or the like. In this arrangement the jacket 26 and insulation 25 are stripped away to provide free lengths of the conductor wires 24 which are joined to the thermocouple wires 15 and typically brazed to produce permanent electrical junctions 28 a short distance away from the open end 20 of the thermocouple casing 18.

In order to protect the electrical junctions 28 and provide a relatively rigid coupling between the sensing element 11 and the extension wires 12, a transition fitting 14 is employed for joining the two elements. In this embodiment of the invention the transition fitting 14 is a machined sleeve 30 having a relatively large diameter at one end 31 to freely accommodate various forms of extension wires 12 and a small diameter at the other end 32 adapted to slide over the casing 18 of the sensing element 11.

The sleeve 30 is preferably machined from a tubular part as indicated by the dashed lines in FIG. 1. The inside diameter for the major portion of the sleeve 30 is dimensioned for clearance of the extension wires 12 and to allow the introduction of encapsulation material and the like. At the other end 32 the sleeve 30 is machined as by turning to provide a reduced diameter portion interconnected with the remainder of the sleeve by a tapered section 34, the thickness of the sleeve at this end 32 being closely controlled in order to provide suitable characteristics for swaging onto the casing 18 of the sensing element 11. Thus it will be clear that after the conductor wires 24 are spliced to the thermocouple wires 15 the sleeve 30 may be slid over the thermocouple casing 18 to the general position illustrated in FIG. 1 and the end 32 swaged or crimped in place by a tool suited for this particular purpose.

The enclosure thus formed within the sleeve 30 may be filled with encapsulation material 35 by way of the open end 31 to provide support for the complete assembly as well as insulation for the electrical junctions 28 between the extension wires 12 and thermocouple wires 15. As noted in FIG. 1 such encapsulation material 35 preferably engages and surrounds the jacket 26 of the extension wires 12 forming a stable assembly. It is clear then that except for the brazing of the electrical junctions 28, no heat is produced in assembling the apparatus in the manner described, eliminating effects upon the electrical characteristics of the sensing element 11 or the material comprising the insulating and supporting structures therein.

Preferably the end 32 of the sleeve 30 is located sufficiently away from the open end 20 of the casing 18 to preclude forcing the insulation 21 toward the open end 20 with possible damage to the sealing material 22, and to avoid a weak mechanical crimp. The selected location will be determined in part by the length of the sensing element 11 desired for exposure outside of the transition fitting 14, for monitoring purposes.

The preferred form of crimp at the end 32 of the sleeve 30 is a two point crimp formed with a suitable tool and consisting of two annular grooves 33 formed completely about the periphery of the end 32, one adjacent the tapered section 34 and one at the edge of the fitting 14. Such deformation of the fitting 14 causes a similar grooved deformation of the casing 18 providing a rigid mechanical connection therewith and an effective mechanical seal for protection from external atmospheric condition.

Figure 2:
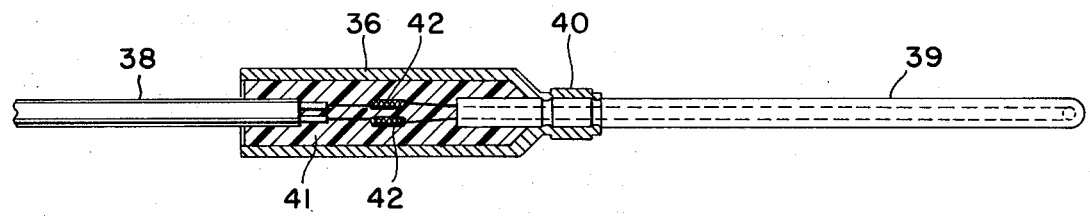
FIG. 2 is an elevational view partly in cross-section of a second embodiment of the invention showing a thermocouple assembly with a formed tubular transition fitting.
Figure 3:
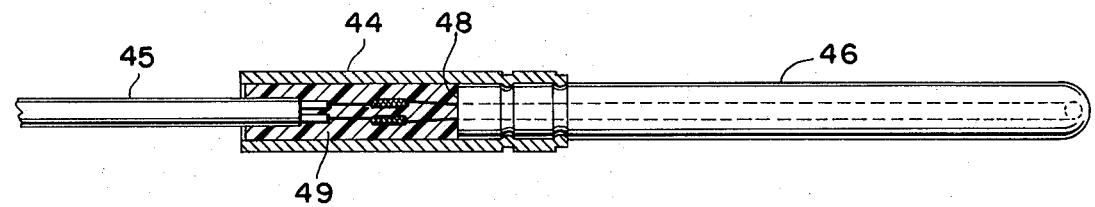
FIG. 3 is an elevational view partly in cross-section of a third embodiment of the invention showing a thermocouple assembly with a uniform inside diameter transition fitting.

It will be apparent that many different forms of transition fittings are amenable to this procedure and further embodiments of the invention are depicted in FIGS. 2 and 3 wherein variable form and predetermined dimension transition fittings respectively are described. Thus FIG. 2 shows a transition fitting 36 located between extension wires 38 and a sensing element 39, the transition fitting 36 in this instance being formed from a tube having a uniform major diameter with an inside diameter larger than the casing of the sensing element 39, thereby being adaptable for various sizes of sensing elements. The tubing is tapered by a metal forming process to fit the casing of the sensing element 39, and the narrow end 40 of the thus formed transition fitting 36 or sleeve may then be crimped or swaged into place on the sensing element 39 in the manner described with reference to FIG. 1.

Similarly, the fitting 36 may be subsequently filled with encapsulation material 41, if desired, to provide substantially the same structural advantages as that previously described. The length of the fitting 36 is not critical but preferably is selected to extend over the jacket of the extension wires 38 a substantial distance to provide support therewith when the enclosure is filled with the encapsulating material. The narrow end 40 of the transition fitting 36 on the sensing element 39 is positioned to locate the junctions 42 of the conductor wires approximately centrally within the fitting 36.

Still another embodiment of this invention is depicted in FIG. 3 where a transition fitting 44 located between extension wires 45 and sensing element 46 is formed of tubing having an inside diameter selected to slidably fit onto the sheath of the sensing element 46. The transition fitting 44 or sleeve is selected to be of suitable thickness to allow the proper metal deformation in swaging onto the sensing element 46. Here again the swaging provides sufficient mechanical attachment between the fitting 44 and the sensing element 46. However, the crimp can be located somewhat inwardly of the open end 48 of the sensing element 46 while the inside diameter of the fitting 44 provides additional support in bearing against the casing of the sensing element 46, completely up to the open end 48 thereof. Again potting compound or other encapsulating material 49 can be introduced into the enclosure within the fitting 44 in the manner previously described.

It will be clear though that other forms of transition fittings are suitable for such mechanical attachment depending upon relative sizes of extension wires and sensing elements, cost considerations and the like, it being necessary only to control the thickness of the transition fitting adjacent the sensing element and the diameter thereat to provide a firm mechanical attachment when the material of the fitting is deformed onto the sensing element. Mechanical tools suited for this purpose are well known in the art, the only requirement being to limit the degree of deformation to prevent damage to the casing of the sensing element and a subsequent insecure attachment thereto. Conventional sensing elements are of rather small diameter, have relatively strong casings and are not particularly susceptable to damage from the swaging operation.

The embodiments of the invention in which an exclusive property or privilege is claimed are defined as follows:

1. Thermocouple apparatus comprising a tubular metallic casing containing thermocouple wires which extend outside an open end of said casing, extension wires in electrical connection outside said casing with said thermocouple wires for transmitting electric current to a remote utilization device, said extension wires being supported in an insulation jacket, and a sleeve having one end extending beyond the open end of said casing and the other end extending over a portion of said insulation jacket of said extension wires forming an enclosure for the electrical connection between said extension wires and said thermocouple wires, said one end of said sleeve being deformed onto said casing spaced from said open end thereof for rigid connection thereto, the entire space within said enclosure surrounding said extension wires and insulation jacket and thermocouple wires being filled with encapsulating material for securing said extension wires to said sleeve and supporting said insulation jacket by said sleeve.

2. Apparatus as set forth in claim 1 wherein said casing is filled with insulation material and said open end of said casing is filled with a sealing material to retain said insulation material and thermocouple wires in place, said one end of said sleeve which is deformed onto said casing being located sufficiently beyond the open end of said casing to preclude forcing said insulation material toward said open end by such deformation of said one end of said sleeve onto said casing.

3. Apparatus as set forth in claim 1 wherein said one end of said sleeve is deformed at two spaced apart locations to provide two spaced apart annular grooves completely about the periphery of said one end, one of said grooves being at the very end of said one end of said casing and the other groove being slightly spaced therefrom.

4. Apparatus as set forth in claim 1 wherein the electrical connection between said extension wires and thermocouple wires is located approximately midway between the ends of said sleeve.

5. Apparatus as set forth in claim 4 wherein the ends of said extension wires are brazed to the ends of said thermocouple wires to provide said electrical connection.

6. Apparatus as set forth in claim 1 wherein said encapsulating material is a potting compound.

7. Apparatus as set forth in claim 1 wherein said sleeve comprises a first section having an inside diameter closely fitting over said casing and a second section loosely fitting over said insulation jacket of said extension wires, said first section being swaged onto said casing.

8. Apparatus as set forth in claim 7 wherein said second section of said sleeve consists of a uniform diameter tube, and said first section consists of a necked down portion connected with said second section by a taper.

9. Apparatus as set forth in claim 7 wherein said second section consists of a uniform major diameter tube, and said first section has a reduced diameter to provide suitable wall thickness for swaging.

* * * * *